United States Patent
Ford

(10) Patent No.: US 10,678,559 B2
(45) Date of Patent: Jun. 9, 2020

(54) MULTI FUNCTION INPUTS PROVIDING ALTERNATE FUNCTIONS DURING SETUP UPON STARTUP OF SIGNAL DEVICE

(71) Applicant: Whelen Engineering Company, Inc., Chester, CT (US)

(72) Inventor: Brendan M. Ford, New Britain, CT (US)

(73) Assignee: Whelen Engineering Company, Inc., Chester, CT (US)

( * ) Notice: Subject to any disclaimer, the term of this patent is extended or adjusted under 35 U.S.C. 154(b) by 218 days.

(21) Appl. No.: 15/837,672

(22) Filed: Dec. 11, 2017

(65) Prior Publication Data

US 2019/0179650 A1 Jun. 13, 2019

(51) Int. Cl.
| | |
|---|---|
| G06F 9/44 | (2018.01) |
| G06F 9/445 | (2018.01) |
| G06F 1/3296 | (2019.01) |
| G08B 5/36 | (2006.01) |
| G08B 5/38 | (2006.01) |
| G08B 7/06 | (2006.01) |
| G06F 30/34 | (2020.01) |
| G06F 9/34 | (2018.01) |
| G06F 9/30 | (2018.01) |
| G06F 117/08 | (2020.01) |

(52) U.S. Cl.
CPC ........ G06F 9/44505 (2013.01); G06F 1/3296 (2013.01); G06F 30/34 (2020.01); G08B 5/36 (2013.01); G08B 5/38 (2013.01); G08B 7/06 (2013.01); *G06F 9/3004* (2013.01); *G06F 9/34* (2013.01); *G06F 2117/08* (2020.01)

(58) Field of Classification Search
None
See application file for complete search history.

(56) References Cited

U.S. PATENT DOCUMENTS

| | | | | |
|---|---|---|---|---|
| 6,356,965 | B1 * | 3/2002 | Broyles | G06F 9/4408 709/220 |
| 6,825,689 | B1 | 11/2004 | Snyder | |
| RE38,795 | E * | 9/2005 | Welling | G08B 7/06 340/326 |
| 7,116,294 | B2 | 10/2006 | Stopa | |
| 7,149,891 | B2 * | 12/2006 | Bruner | G06F 3/0607 713/100 |
| 8,013,535 | B2 | 9/2011 | Jozwik | |
| 2008/0270910 | A1 * | 10/2008 | Lukasik | H04L 67/08 715/740 |
| 2009/0045754 | A1 * | 2/2009 | Jozwik | H05B 33/0842 315/200 A |

(Continued)

*Primary Examiner* — Danny Chan
(74) *Attorney, Agent, or Firm* — Alix, Yale & Ristas, LLP

(57) ABSTRACT

Software is used to allow inputs to a microcontroller to have primary and alternate functions, which reduces the need for additional inputs and associated conductors in a programmable device such as a warning signal light. The microcontroller firmware includes a routine that detects the state of inputs during a first predetermined period of time after initialization of the microcontroller. The state of the inputs is used to activate alternate modes of operation in which changes in the state of the inputs is detected and used for functions different than a function associated with the same input in another mode of operation.

18 Claims, 7 Drawing Sheets

(56) References Cited

U.S. PATENT DOCUMENTS

| | | | |
|---|---|---|---|
| 2009/0172383 A1* | 7/2009 | Cumming | G06F 9/441 |
| | | | 713/2 |
| 2011/0314267 A1* | 12/2011 | Watanabe | G06F 9/4401 |
| | | | 713/2 |
| 2013/0067119 A1* | 3/2013 | Wong | G06F 1/24 |
| | | | 710/10 |
| 2015/0303799 A1* | 10/2015 | Tang | H02M 3/158 |
| | | | 323/271 |

* cited by examiner

| | PATTERN | SYNC | PHASES | TIMING (in mS) |
|---|---|---|---|---|
| * 1/2 | DOUBLE 120 | YES | 1&2 | 55 ON / 55 OFF / 80 ON / 300 OFF |
| * 3/4 | SINGLE 135 | YES | 1&2 | 150 ON / 300 OFF |
| 5/6 | SIGNAL ALERT 75 | YES | 1&2 | (4) 25 ON / 25 OFF, THEN 200 ON AND 400 OFF |
| 7/8 | COMET 75 | YES | 1&2 | (4) 50 ON / 50 OFF, THEN 400 OFF |
| 9/10 | DOUBLE 75 | YES | 1&2 | 150 ON / 50 OFF / 150 ON / 400 OFF |
| 11/12 | SINGLE 75 | YES | 1&2 | 335 ON / 465 OFF |
| 13/14 | COM-ALERT 75 | YES | 1&2 | (2) 50 ON / 50 OFF, THEN 200 ON AND 400 OFF |
| 15/16 | LONG BURST 75 | YES | 1&2 | (5) 50 ON / 50 OFF, THEN 400 OFF |
| 17/18 | PING-PONG 75 | YES | 1&2 | 250 ON / 50 OFF / 70 ON / 400 OFF |
| 19 | SINGLE 60 | NO | 1 | 400 ON / 600 OFF |
| 20 | SINGLE 90 | NO | 1 | 280 ON / 390 OFF |
| 21 | SINGLE 120 | NO | 1 | 200 ON / 300 OFF |
| 22 | SINGLE 300 | NO | 1 | 80 ON / 120 OFF |
| 23 | DOUBLE 150 | NO | 1 | 75 ON / 50 OFF / 75 ON / 200 OFF |
| 24 | COM-ALERT 150 | NO | 1 | (2) 25 ON / 25 OFF, THEN 150 ON / 200 OFF |
| 25 | ACTION FLASH 30 | NO | 1 | 2 CYCLES COMET 75 / 2 CYCLES SINGLE 30 |
| 26 | ACTION FLASH 150 | NO | 1 | 2 CYCLES COMET 75 / 4 CYCLES SINGLE 150 |
| 27 | MEGA-FLASH | NO | 1 | VARIABLE, 30 ON to 150 ON to 30 ON OVER 5.0 SECONDS |
| 28 | ACTION SCAN | NO | 1 | RANDOM SELECTION OF PATTERNS |
| 29 | STEADY | NO | 1 | STEADY FOR ONE SECOND THEN SLOW RAMP TO 50% |

Figure 3

MULTI FUNCTION INPUTS PROVIDING ALTERNATE FUNCTIONS DURING SETUP UPON STARTUP OF SIGNAL DEVICE

BACKGROUND

The disclosure relates to methods for employing a single input to a microcontroller to perform multiple functions.

Advances in the manufacture of components used in electronic devices have made it possible to create smaller and more compact products having enhanced functionality. Very compact surface mount electronic components and advanced PC board manufacturing techniques have reduced the surface area necessary for electronic circuits. Mounting conductors to a PC board is one aspect of electronics manufacture that has resisted miniaturization, meaning that conductors necessary to power and communicate with an electronic circuit occupy an increasingly large part of the overall PC board surface area.

Programmable devices incorporating microcontrollers are standard in many areas of technology, with the microcontroller including memory, a processor, inputs for receiving signals and outputs for emitting signals. Firmware stored in memory is executed by the processor to perform desired functions. Programmable devices commonly require conductors for supplying power, communications, and signal pathways to and from a PC board supporting the microcontroller and related circuitry. Depending upon the end use for the programmable device, it may be necessary to protect the programmable device from the environment by means of a sealed housing. Various rubber or elastomeric seals may be employed to prevent materials from the environment from passing into the housing in the area where conductors pass through the housing. It is also known to use potting materials that are applied in liquid form and cure to form a plug around conductors passing through the housing. The conductors and sealing around the conductors can represent a significant cost of manufacture in terms of materials and labor. Further, although known seals have proven effective, the area around conductors passing through a housing are a known path for leakage from the environment that can cause failure of the programmable device.

Programmable devices can enhance the functionality of a wide variety of devices by incorporating optional features that can be selected by means of one or more electrical inputs. One common prior art method of providing an input to a programmable device is a DIP switch, where the position of switches provides inputs to the programmable device corresponding to the desired optional features. Such switches are limited in terms of the number of options available and are impractical in the context of a sealed housing.

One example of a programmable device is a warning light that generates warning light signals for use in conjunction with an emergency vehicle. The warning light may include a microcontroller with a library of light signal patterns that can be selected for display by the warning light. U.S. Pat. No. RE38,795 discloses a programmable warning light which includes a library of instructions for generating different warning light signals. The instructions are stored so that the beginning of each instruction is located at a specific memory address. The memory address associated with the beginning of each instruction is stored in a list or table. A program running on a microcontroller in the warning light monitors the state of an input and responds to a change in state of the input to step through the list or table of instructions. The microcontroller is programmed to save the memory address corresponding to the last instruction selected. The microcontroller uses the stored memory address to generate selected warning light signal until the monitored "pattern select" input is active. This allows a user to select one of the stored instructions. The disclosed warning light includes a conductor that is used only for the purpose of pattern selection, which is then not used for any other purpose.

U.S. Pat. No. 7,116,294 discloses LED driver circuits that coordinate the timing of warning light signals generated by otherwise separate and independent warning signal lights. A "SYNC" conductor connects the warning signal lights, and the driver circuits include a microcontroller programmed to monitor an input connected to the SYNC conductor. Simply stated, if the sync input is active (has changed state) when polled by the microcontroller, the microcontroller is programmed to follow a pattern of pulses applied to the SYNC conductor. If the state of the input has not changed when polled by the microcontroller, the microcontroller initiates a flashing sequence, and activates a SYNC output to place a pulse on the SYNC conductor that is detectable by other warning lights connected to the SYNC conductor. This synchronizing circuit allows any number of driver circuits connected to a common SYNC line to coordinate their flashing patterns without resort to a central controller. The contents of U.S. RE38,795 and U.S. Pat. No. 7,116,294, both assigned to the assignee of the present application, are hereby incorporated by reference in their entirety.

There is a need in the art to minimize the number of conductors entering the housing of a programmable device.

Accordingly, there is a need in the art to enhance the functionality of conductors that are present in a device

SUMMARY OF THE INVENTION

Software is used to allow inputs to a microcontroller to have primary and alternate functions, which reduces the need for additional inputs and associated conductors in a programmable device such as a warning signal light. The microcontroller firmware includes a routine that detects the state of inputs during a first predetermined period of time after initialization of the microcontroller. The state of the inputs is used to activate alternate modes of operation in which changes in the state of one of the inputs is detected and used for functions different than a function associated with the same input in another mode of operation.

One example of a programmable device utilizing the disclosed multi-function input is a warning signal light. The warning signal light includes a microcontroller with memory and firmware configured to execute an instruction saved in memory to generate a warning light signal. The warning signal light is programmed with a plurality of instructions for generating different warning light signals. Addresses associated with each of the saved instructions are saved in a table or register, and the microcontroller is programmed to execute the instruction at a saved address identified by an address pointer. The warning signal device includes two conductors and associated inputs to the microcontroller that are used for a primary function during normal operation of the warning signal light. The warning signal light is programmed to detect the state of the inputs associated with the conductors during a predetermined period after initialization of the microcontroller. The state of the inputs is used to place the microcontroller in modes of operation other than the normal mode. In the alternate modes of operation, the inputs are employed to, for example, move the address pointer to select a different warning signal pattern to be generated by the warning signal light. When the inputs are returned to a different state, and the warning signal light is turned off and on again, the warning signal light operates in a normal mode and the inputs are employed for their primary function.

BRIEF DESCRIPTION OF THE DRAWINGS

FIG. 3 is a representative list of warning light signals that can be stored in memory of the programmable circuit of FIGS. 2A-2C and emitted from the warning signal light of FIG. 1;

DETAILED DESCRIPTION

Figure 1:
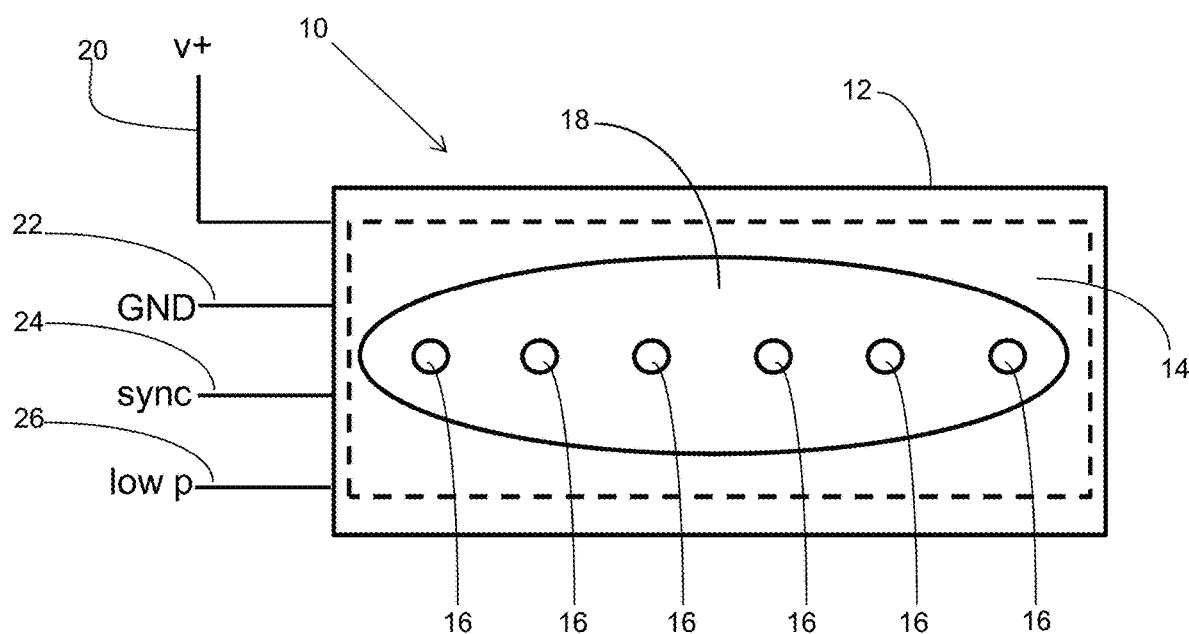
FIG. 1 illustrates a representative warning signal light according to aspects of the disclosure.

The disclosed multi-function input will be described in the context of a self-contained warning signal light 10, but is not limited to that use. As shown in FIG. 1, a warning signal 10 light according to the disclosure includes a housing 12 that may provide a sealed enclosure to protect a printed circuit (PC) board 14, LEDs 16 and optics 18. The PC board 14 includes circuit connections and electronic components for a microcontroller that energizes the LEDs 16 to generate a warning light signal selected from a plurality of warning light signals stored in memory. The product may be very compact, which can limit the surface area of the PC board 14. In the warning light 10 of FIG. 1, four conductors extend from the PC board 14 through a sealed opening (not shown) in the housing for connection of the warning light 10 to the electrical system of a vehicle, and other warning lights, where applicable. The conductors include a power conductor 20, a ground conductor 22, a SYNC conductor 24 and a Low Power conductor 26.

Figure 2A:
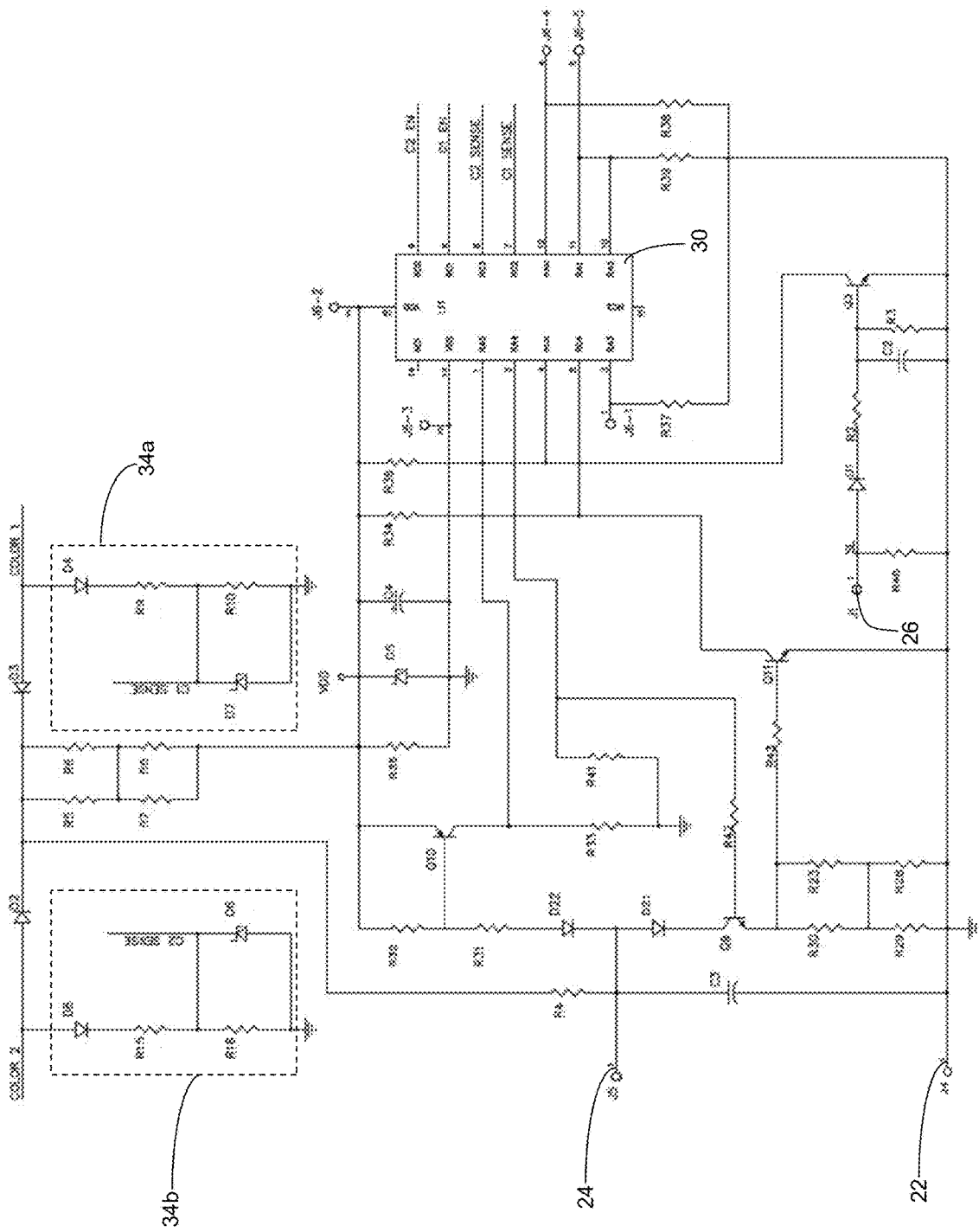
FIGS. 2A, 2B and 2C are a schematic showing a programmable electronic circuit according to aspects of the disclosure.
Figure 2B:
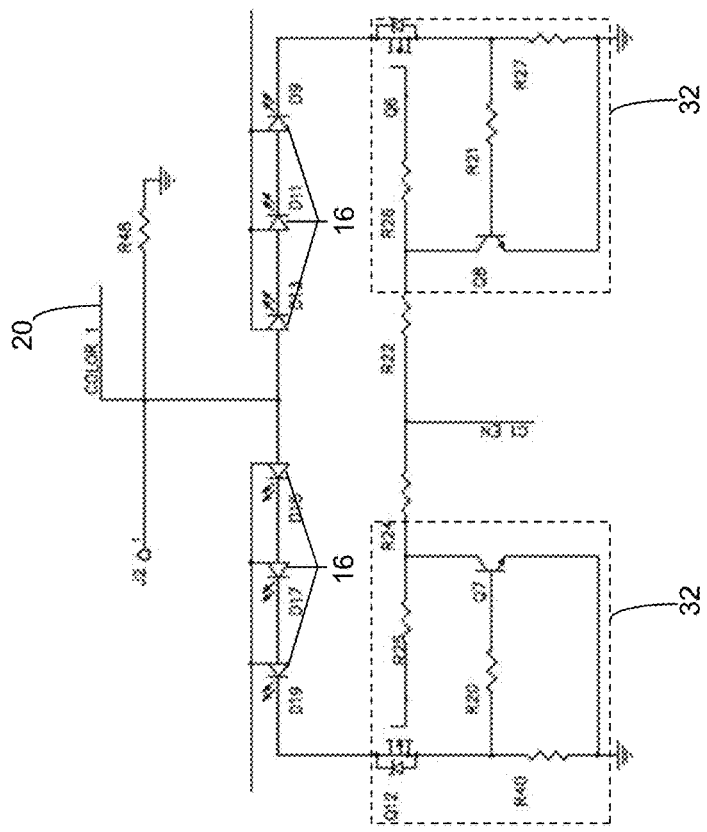
Figure 2C:
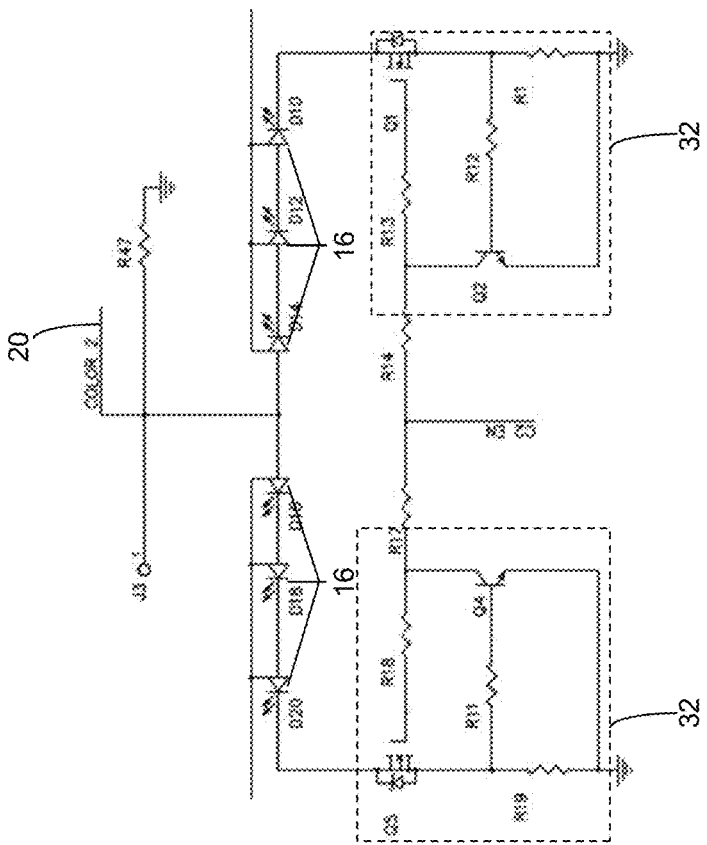

FIGS. 2A, 2B, and 2C illustrate a representative electronic circuit that may be arranged on the PC board 14. The electronic circuit includes a microcontroller 30 with a processor, addressable memory, inputs and outputs as are known in the art. One suitable microcontroller is a PIC16F684 14 pin Flash-based 8-bit CMOS microcontroller from Microchip Technology, Inc. The microcontroller 30 includes firmware stored in memory for execution by the processor. The firmware includes a plurality of warning signal instructions stored in memory, with the beginning of each instruction located at a memory address. When executed by the microcontroller, each instruction results in a periodic application of power to the LEDs 16 to generate a warning light signal. FIG. 3 illustrates a representative list of warning light signals, each corresponding to a warning signal instruction stored in memory of the microcontroller 30. The microcontroller firmware retrieves the address of a default (or user selected) warning signal instruction and applies power to the LEDs according to the instruction to generate the selected warning light signal. Each warning light signal consists of a repeating pattern of light emissions, which may be referred to as a flash pattern.

The embodiment of the disclosed warning signal light 10 shown in FIG. 1 is a single color warning light including six LEDs 16 of the same color. Alternative warning lights may include 12 LEDs, with six LEDs being one color and six LEDs being another color. Each color of LEDs will include a separate power conductor 20, so a two color warning signal light will include a total of five conductors (power for color1 and color2, ground, SYNC, and LOW POWER. According to aspects of the disclosure, each color of LEDs will have its own register of instructions. In an alternative configuration, there may be a third register of instructions for warning light signals including both colors flashing alternately.

In FIG. 1, the SYNC conductor 24 and the LOW POWER conductor 26 are connected to the microcontroller 30 by transistor circuits to apply or remove logic level signals to inputs monitored (polled) by the microcontroller firmware as described in greater detail below. Aspects of the disclosure relate to firmware functionality that allow these two conductors to each perform more than a single function. Each conductor has a primary function and an alternate function, which eliminates the need for additional conductors and inputs to the microcontroller.

FIG. 2B illustrates two constant current sinks 32 arranged to apply power to a series string of 3 LEDs 16. A power conductor 20 is connected to the series strings of LEDs 16 and the constant current sinks 32 control current flowing through each series string of 3 LEDs 16. The current sinks 32 are controlled by an enable signal C1 EN generated by the microcontroller 30 at output RC1. A logic high at output RC1 turns on FET transistors Q6 and Q12, which are regulated by current sense feedback through transistors Q8 and Q7, respectively. The disclosed current sinks 32 are in the form of a linear regulator and when turned on provide a continuous flow of constant current to the LEDs 16. Other circuit configurations that deliver constant current are also compatible with the disclosed warning light, such as switching constant current regulators, switch mode power supplies with load current feedback regulation in a buck, boost, buck-boost topology or the like. Applying and removing the C1 EN signal according to the selected instruction generates the desired warning light signal. Pulsing the output RC1 on and off at a frequency of approximately 200 Hz allows the disclosed driver circuit to modulate the intensity of light emitted from the LEDs 16 by reducing the average current applied to the LEDs 16. This may be referred to as pulse width modulation (PWM), as is known in the art.

In the disclosed circuit of FIG. 2A, the power conductor 20 is also connected at COLOR 1 to a sensing circuit 34a that generates an input C1 SENSE to the microcontroller at RC2. The microcontroller 30 is programmed to respond to the C1 SENSE input (logic high) at RC2 by retrieving an address corresponding to a warning signal instruction stored in the instruction set register for the color of LEDs connected to power (the LEDs 16 of FIG. 2B). If there is only one color of LEDs 16, then the warning signal light 10 will include only one power conductor 20 and use only one register of warning signal instructions. In the case of a warning light with two colors, PC board 14 will include another set of LEDs 16, and another pair of current sinks 32, such as that shown in FIG. 2C. The firmware will include a second instruction set register for the additional color. Application of power to the second set of LEDs at COLOR 2, also applies power to a second sensing circuit 34b, which generates an input C2 SENSE that is applied to input RC3 of the microcontroller 30. The microcontroller 30 is programmed to respond to a logic high C2 SENSE signal at input RC3 by retrieving the saved address of a selected warning signal instruction from an instruction set register corresponding to that color. In the case of a two color warning light signal, there would be a third instruction set register of warning signal instructions accessed by application of power to the power conductors corresponding to both colors of LEDs (COLOR 1 and COLOR 2).

Some warning light signals are intended to be coordinated with light signals generated by other warning lights connected to the SYNC conductor 24. As shown in FIG. 3, instruction sets for these "synchronizable" patterns include an instruction for a phase A and phase B, with one phase beginning with the active or illuminated part of the warning light signal and the other phase beginning with the inactive or off part of the warning light signal. The patterns emitted by warning lights connected to the SYNC conductor 24 can be selected to allow the warning lights to flash "in phase," or "out of phase" in a "wig wag" presentation.

Figure 5:
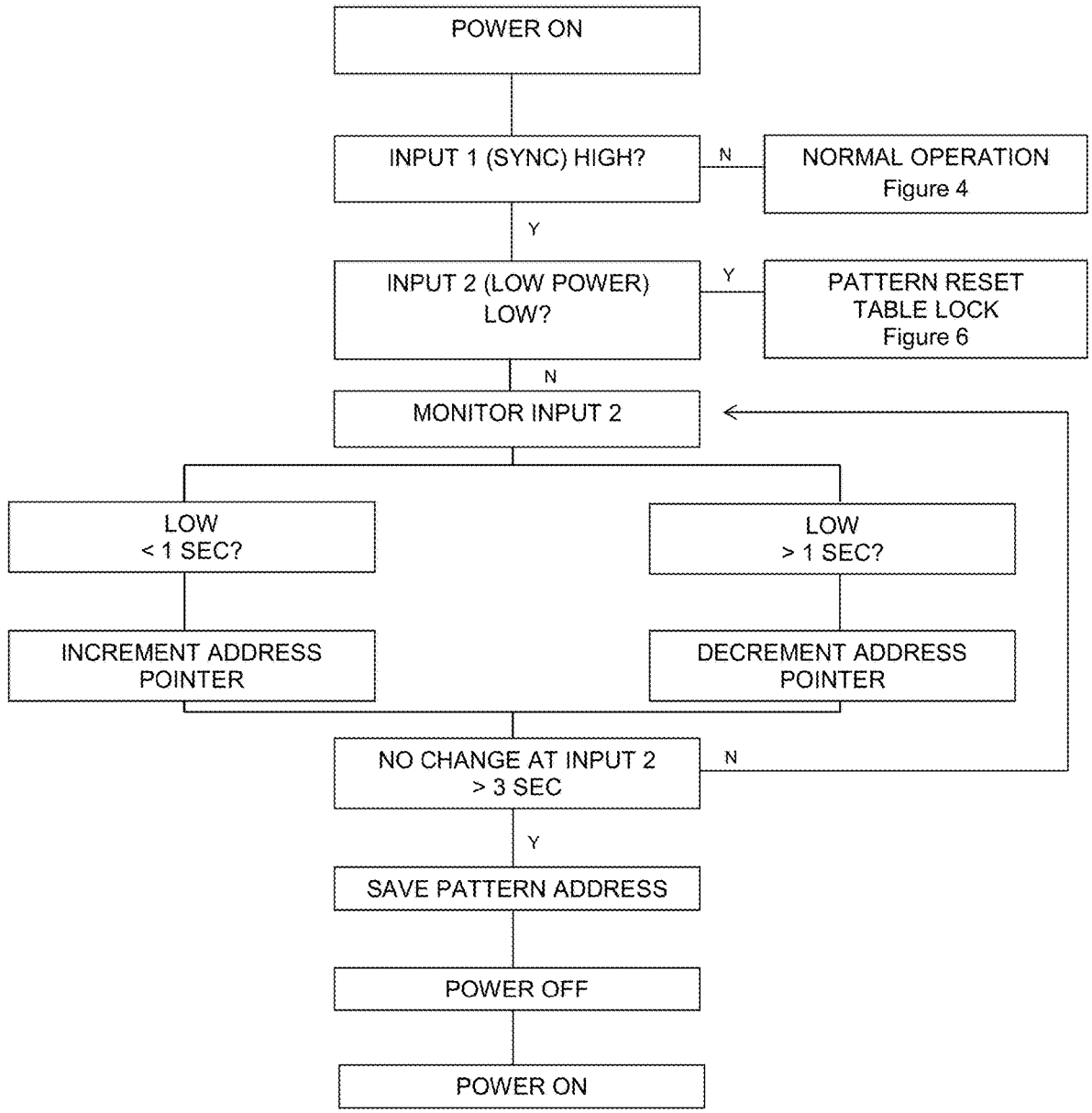
FIG. 5 is a flow chart showing program activity of one embodiment of a warning signal light in a pattern selection mode of operation.
Figure 6:
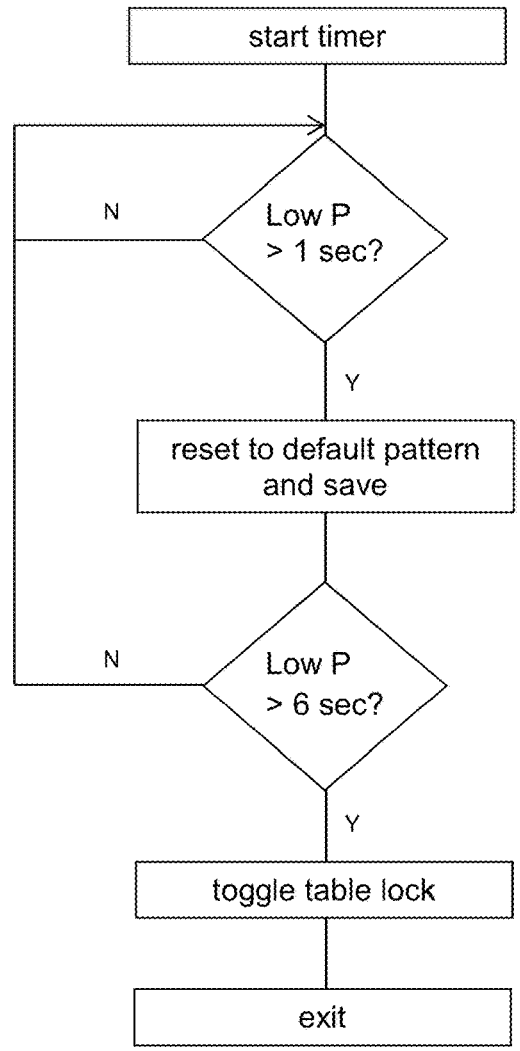
FIG. 6 is a flow chart showing program activity of one embodiment of a warning signal light in a pattern reset/table lock toggle mode of operation.

The disclosed warning light 10 is programmed to have three modes of operation: a normal mode (see FIG. 4), a pattern selection mode (see FIG. 5) and a pattern reset/table lock toggle mode (see FIG. 6). The microcontroller 30 is programmed to, after initialization, detect the state of the inputs RA5 (SYNC) and RC5 (LOW POWER), and enter the pattern selection mode or pattern reset/table lock toggle modes depending upon the state of the SYNC and LOW POWER inputs. If the SYNC input is not active after initialization, the microcontroller is programmed to operate in normal mode, as shown in FIG. 4.

Figure 4:
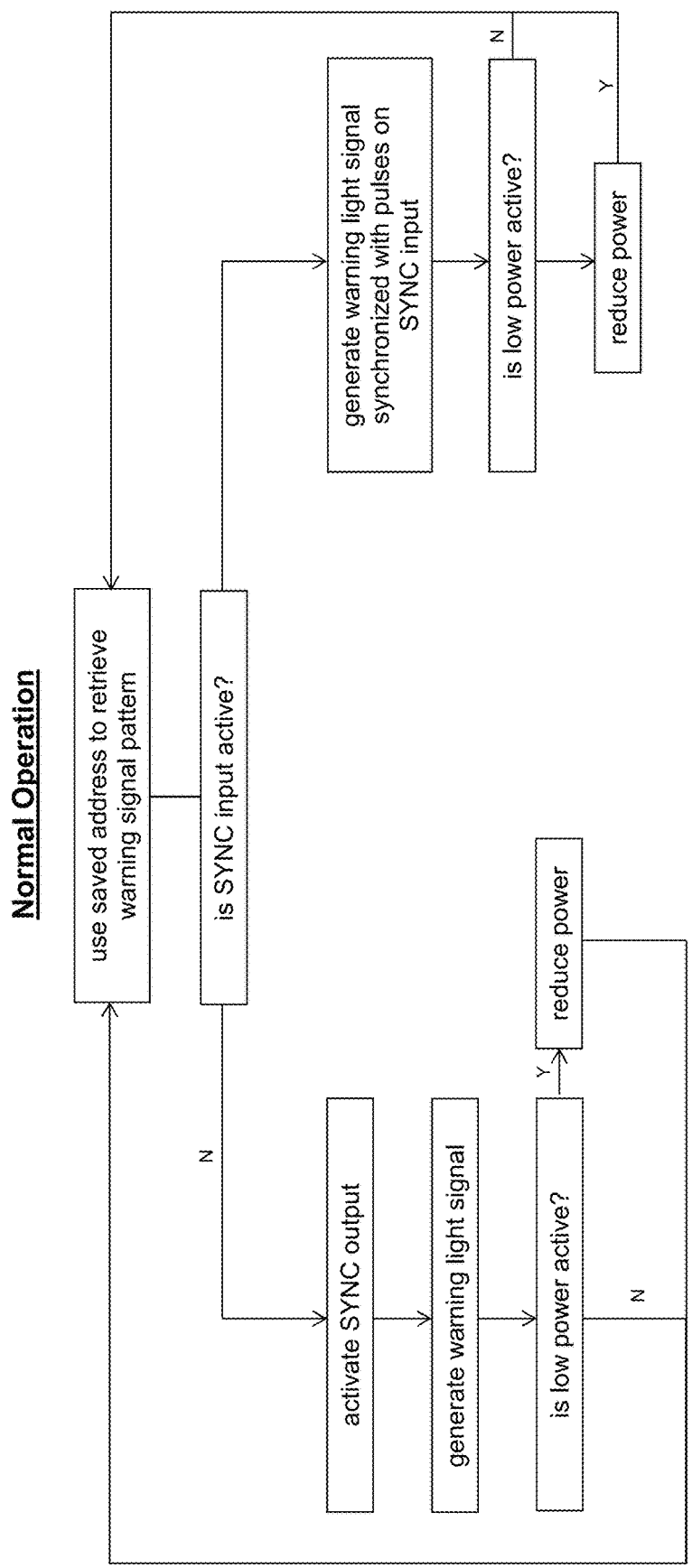
FIG. 4 is a flow chart showing program activity of one embodiment of a warning signal light in a normal mode of operation.

The SYNC and LOW POWER conductors have a primary function of providing inputs to the microcontroller in the normal mode, as shown in FIG. 4. In the disclosed warning light 10, the primary function the LOW POWER conductor 26 is to deliver a low power signal to the microcontroller 30 in the form of a logic low at input RC5. Input RC5 is monitored by the microprocessor 30 during normal operation of the warning light as illustrated in FIG. 4. A change of state on the LOW POWER input RC5 results in PWM of signal C1 EN to the current sinks 32 of FIG. 2B, which generates a warning light signal of reduced intensity. In some jurisdictions, reduced intensity warning light signals are required at night to prevent excessive glare. The PWM may range from 40% to 10% "on" time for the C1 EN or C2 EN signal, depending upon the color of LEDs being driven at low power and the intended reduction of light signal intensity.

As shown in FIG. 4 and FIG. 2A, the SYNC conductor 24 has a primary function during normal operation as a synchronization "SYNC" line, allowing multiple warning lights to operate on the same timing and generate coordinated light signals even though they are driven by separate control circuits. The microprocessor 30 of each warning light 10 is programmed to monitor input RA5 connected to the SYNC conductor 24 for a change of state, or pulse that is used to synchronize the timing of light signals generated by the warning lights whose SYNC conductors are connected together. In the disclosed warning light 10, the microprocessor 30 is programmed to follow a low going pulse on the SYNC conductor 24, or to apply a low going pulse to the SYNC conductor 24 if none is detected. Because the internal clocks and components of each warning light vary slightly, one of the warning lights connected to the SYNC conductor 24 will be the first to initiate a warning light signal and place a low going pulse on the SYNC conductor 24 by placing a logic high on output RA4. A logic high at output RA4 turns on transistor Q9 and pulls the SYNC conductor 24 low. The warning signal lights connected to the SYNC conductor 24 are also programmed to sense the state of the SYNC conductor 24 and coordinate the timing of their respective warning light signals to the pulse as shown in FIG. 4. In this arrangement, one warning light assumes the role of "leader" by putting a low going pulse on the SYNC conductor, and the others follow.

In the disclosed warning signal light 30, the LOW POWER conductor 26 and SYNC conductor 24 have a secondary (alternate) function that allow a user to employ these conductors to enable modes of operation in addition to the normal mode of operation shown in FIG. 4. Adding the alternate function for these two conductors allows user access to additional features without adding additional conductors to the warning signal light 10. FIG. 5 illustrates a pattern selection mode of operation that is activated by connecting the SYNC conductor 24 to ground before powering up the warning signal light 10. As shown in FIG. 2A, connecting the SYNC conductor 24 to ground turns on transistor Q10 and provides a logic high at SYNC input RA5. As shown in FIG. 5, the microcontroller 30 is programmed to look at the state of the SYNC input RA5 after initialization, and if the SYNC input is high, to then look at the state of the LOW POWER input at RC5. If the SYNC input is high and the LOW POWER input RC5 is low, the microcontroller 30 enters a PATTERN RESET/TABLE LOCK TOGGLE mode of operation illustrated in FIG. 6. If the SYNC input is high and the LOW POWER input is also high, then the microcontroller 30 enters the PATTERN SELECT mode of operation shown in FIG. 5.

The firmware installed on the microcontroller 30 includes an instruction set register, which is a list or table of addresses associated with instructions for different warning light signals for each color of LEDs. The beginning of each warning signal instruction has an address in memory, and the addresses are assembled into a table. An address pointer is moved up (incremented) and down (decremented) the table of addresses (the instructions et register) according to the duration of a change of state of the LOW POWER conductor 26 when the warning signal light 10 is in the PATTERN SELECT mode illustrated in FIG. 5.

Application of vehicle power (approximately 12 volts) to the LOW POWER conductor 26 applies a logic low to input RC5. The microcontroller 30 is programmed to measure the duration of the logic low by setting a timer upon detecting the change of state at RC5 in the PATTERN SELECT mode. If the duration is less than one second, the microcontroller 30 advances (increments) the address pointer to the address corresponding to the next instruction set in the table of instruction set addresses. If the duration is greater than one second, the microcontroller 30 decrements or retreats to the previous address on the list. At the top or bottom of the table or register of instruction addresses, the microcontroller 30 is programmed to loop around to the next or previous address, so it is possible to cycle through the entire address table or register by advancing or retreating one address at a time according to the steps shown in FIG. 5. According to aspects of the disclosure, during the process of pattern selection, the warning light 10 is actively generating each pattern as the address pointer is incremented or decremented, so the change of address (pattern) is apparent to the user.

If the input (RC5) corresponding to the LOW POWER conductor does not change for a predetermined period of time between 3 and 5 seconds, then the microcontroller 30 is programmed to save the address corresponding to the selected (current) warning signal pattern as the new default warning signal pattern. After saving the address corresponding to the newly selected warning signal instruction, the microcontroller 30 is programmed to turn off and then turn on again to indicate that the address corresponding to a new default warning signal has been saved, as shown in FIG. 5. The warning signal light 10 will generate the new default warning signal until it is changed again. Removing the SYNC conductor from ground, powering the warning signal light 10 off and on returns the microcontroller firmware to the normal mode of operation.

In some embodiments of the disclosed warning light 10, the list or register of instructions for warning light signals may be "locked" so that only a subset of the patterns in the register is available for selection in the PATTERN SELECT mode. A locked instruction set register may be used to limit the options for an installer to ensure compliance with local or regional requirements for warning light signals. For example, European jurisdictions limit warning light signals to simple single and double flash patterns. According to aspects of the disclosure, the instruction set register(s) for warning lights sold into a jurisdiction with such regulations may be locked and so patterns available for selection are limited to patterns that are compliant with the relevant regulations. In the exemplary table of warning light signals included in FIG. 3, an embodiment of a warning light 10 may be "locked" to allow selection of only patterns 1-4.

The firmware for the microcontroller 30 may include a third mode of operation that allows an installer to "unlock" the pattern list to access instructions for warning light signal patterns other than the regionally compliant warning light signals. In this embodiment, the microcontroller 30 is programmed to, after initialization and before entering a normal mode of operation, to look at the state of the microcontroller inputs RA5 and RC5 corresponding to the SYNC conductor 24 and the LOW POWER conductor 26, respectively. As shown in FIG. 5, if the input corresponding to the SYNC conductor is logic high (indicating that the sync conductor is grounded), then the microcontroller 30 then looks at the state of the microcontroller input corresponding to the LOW POWER conductor 26. If the input corresponding to the LOW POWER conductor 26 is logic low (indicating that the LOW POWER conductor 26 is connected to a voltage source such as vehicle power), then the microcontroller 30 enters the PATTERN RESET/TABLE LOCK TOGGLE shown in FIG. 6. In the disclosed warning lights, the default warning signal pattern is the first pattern in the list or register. When in the PATTERN RESET/TABLE LOCK TOGGLE mode, the microcontroller 30 is programmed to measure the duration of a logic low at the LOW POWER input (RC5). When the LOW POWER conductor 26 has been connected to power for longer than one second, the address pointer of the instruction set register for the relevant color is reset to the memory address location corresponding to the default warning light signal (pattern #1). Maintaining the LOW POWER conductor 26 connection to power for five additional seconds toggles the pattern table lock to an unlocked condition. This process can be repeated to toggle the pattern table lock back to a locked condition.

What is claimed:

1. A programmable device, the programmable device comprising:
   a processor;
   a plurality of inputs coupled to the processor, wherein at least a first input and second input each have a primary function and an alternate function; and
   memory coupled to the processor, the memory configured to store an operating program and further comprises a set of instructions;
   wherein the processor is adapted to execute the operating program stored in memory comprising the steps of:
   monitoring the state of the first input upon initialization of the processor for a first period of time, the first input having applied a first potential corresponding to a first state, the first state placing the programmable device in a normal mode and a second potential corresponding to a second state, the second state placing the programmable device in a setup mode;
   entering the normal mode when the processor determines that the normal mode has been selected, wherein the first and second inputs are utilized with their primary function;
   entering the setup mode when the processor determines that the setup mode has been selected, the setup mode further comprising:
   monitoring the state of the second input for the alternate function and follow the set of instructions based on detected state changes of the second input; and
   exiting the setup mode based on a condition determined by the processor and based on at least one of the first and second inputs of the plurality of inputs, wherein information based, at least in part, on the condition determined by the processor is saved to memory;
   wherein during the setup mode, the processor is further adapted to execute the operating program stored in memory comprising the step of ending the setup mode when the state potential of the first input is detected as transitioning from the second state to the first state.

2. The programmable device of claim 1, wherein during normal mode operation the processor is further adapted to execute the operating program stored in memory comprising of the step of monitoring the primary function of the first input, wherein the primary function of the first input is a synchronization input to enable synchronous operation with other programmable devices.

3. The programmable device of claim 1, wherein during normal mode operation the processor is further adapted to execute the operating program stored in memory comprising of the step of monitoring the primary function of the second input, wherein the primary function of the second input is to deliver a low power input, the second input having applied a first potential corresponding to a first power state, the first power state placing the programmable device in a normal power mode and a second potential corresponding to a second power state, the second power state placing the programmable device in a low power mode of operation.

4. The programmable device of claim 1, wherein during setup mode operation the processor is further adapted to execute the operating program stored in memory comprising of the steps of:
   detecting a continuous state potential present at the second input for a predetermined time period; and
   resetting to a default addressable instruction, corresponding to a warning signal pattern, in the set of instructions saved in memory.

5. The programmable device of claim 1, wherein during setup mode operation the processor is further adapted to execute the operating program stored in memory comprising of the steps of:
   detecting a continuous state potential present at the second input for a predetermined time period; and
   toggling an addressable instruction to unlock or lock a pattern table in the set of instructions saved in memory.

6. The programmable device of claim 1, wherein during normal mode operation the processor is further adapted to execute the operating program stored in memory comprising of the steps of:
   generating an address signal which corresponds to a memory location of an instruction commensurate with an active warning pattern;
   employing the generated address signal to retrieve the instruction commensurate therewith;
   monitoring the first and second inputs for their primary function; and
   using the retrieved instruction along with first and second inputs to control the periodic energization of an energy radiator of a warning device.

7. The programmable device of claim 1, wherein during the setup mode, an address signal which corresponds to a memory location of the set of instructions is incremented or decremented based on the time duration of a state potential detected on the second input exceeding a predetermined time duration.

8. A method for utilizing a first and second input each with a primary function and an alternate function, the method comprising:
   monitoring the state of the first input for a first period of time upon initialization of the processor, the first input having applied a first potential corresponding to a first state, the first state activating a normal mode and a second potential corresponding to a second state, the second state activating a setup mode;
   entering the normal mode when the processor determines that the normal mode has been selected, wherein the first and second inputs are utilized with their primary function;
   entering the setup mode when the processor determines that the setup mode has been selected, the setup mode further comprising:
      monitoring the state of the second input for the alternate function and following a set of processor instructions based on detected state changes of the second input;
      ending the setup mode based on a condition determined by the processor and based on at least one of the first and second inputs of the plurality of inputs, wherein information based, at least in part, on the condition determined by the processor is saved to memory;
   wherein the method further comprises during normal mode, monitoring the primary function of the first input, wherein the primary function of the first input is a synchronization input to enable synchronous operation with other programmable devices.

9. The method of claim 8, further comprising during normal mode, the processor is further adapted to execute the operating program stored in memory comprising of the step of monitoring the primary function of the second input, wherein the primary function of the second input is to deliver a low power input, the second input having applied a first potential corresponding to a first power state, the first power state activating a normal power mode and a second potential corresponding to a second power state, the second power state activating a low power mode of operation.

10. The method of claim 8, further comprising the steps during setup mode:
   detecting a continuous state potential present at the second input for a predetermined time period; and
   resetting to a default addressable instruction, corresponding to a warning signal pattern, in a set of instructions saved in memory.

11. The method of claim 8, further comprising the steps during setup mode:
   detecting a continuous state potential present at the second input for a predetermined time period; and
   toggling an addressable instruction to unlock or lock a pattern table in a set of instructions saved in memory.

12. The method of claim 8, further comprising the steps during normal mode:
   generating an address signal which corresponds to a memory location of an instruction commensurate with an active warning pattern;
   employing the generated address signal to retrieve the instruction commensurate therewith;
   monitoring the first and second inputs for their primary function; and
   using the retrieved instruction along with first and second inputs to control the periodic energization of an energy radiator of a warning device.

13. The method of claim 8, further comprising during setup mode, an address signal which corresponds to a memory location of a set of instructions which is incremented or decremented based on the time duration of a state potential detected on the second input exceeding a predetermined time duration.

14. The method of claim 8, further comprising the step of ending the setup mode being determined by the state potential of the second input being held at a constant potential exceeding a predetermined time period.

15. The method of claim 8, further comprising the step of ending the setup mode when the state potential of the first input is detected as transitioning from the second state to the first state.

16. The method of claim 8, further comprising the step of reinitializing a programmable device after the setup mode is ended.

17. A warning device comprising:
   a microcontroller with memory, a processor and at least a first input and a second input, each of said first and second inputs having a first state and a second state detectable by said microcontroller, wherein when detected by said microcontroller the first state of the first input places the warning device in a first mode of operation, and wherein when detected by said microcontroller the second state of the first input places the warning device in a second different mode of operation;
   program instructions stored in the memory, said program instructions including a plurality of instructions for generating warning signals, each of said plurality of instructions stored at a memory address, the memory addresses of each of said plurality of instructions stored in a table;
   a warning signal generator responsive to said microcontroller to generate a warning signal corresponding to each of said plurality of instructions;
   wherein said program instructions include:
   on startup of the warning device, monitoring the state of the first input and if said first input is in the first state, monitoring the state of the second input and responding to changes in the state of the second input to step through the table of memory addresses, wherein when the second input does not change state for a predetermined period of time, then saving the memory address; or if said first input is in the second state, executing the instructions corresponding to an address saved in memory to generate a warning signal.

18. The programmable device of claim 1, wherein the programmable device comprises a warning signal device, wherein the normal mode comprises a warning signal normal mode which is an operating mode of the warning signal device, and wherein the setup mode comprises a warning signal setup mode which is another different operating mode of the warning signal device.

\* \* \* \* \*